Patented Oct. 13, 1931

1,827,082

UNITED STATES PATENT OFFICE

HERBERT A. GOLLMAR, OF EAST ORANGE, NEW JERSEY, ASSIGNOR TO THE KOPPERS COMPANY, A CORPORATION OF DELAWARE

TREATMENT OF ARSENICAL SOLUTIONS

No Drawing. Application filed March 17, 1927. Serial No. 176,299.

This invention relates to the treatment of arsenical solutions and more particularly to the recovery of arsenic therefrom.

My invention has particular relation to the treatment of arsenical solutions useful for the purification of gases from hydrogen sulphide and the like.

The preparation and the use of thio-arsenic compounds for gas purification are described and claimed in United States Patents Nos. 1,719,177, and 1,719,762, both granted July 2, 1929.

The method of preparation of such compounds consists briefly in sulphiding a solution of an arsenic compound such as arsenious acid produced by dissolving arsenious acid in water and an alkali such as sodium carbonate or alkaline earth metal compound such as lime and subsequently aerating the sulphided solution. There results a solution of a substance which I have designated as a "thio-arsenic compound" and which is capable of absorbing further hydrogen sulphide and of being regenerated by aeration with liberation of sulphur and without liberation of hydrogen sulphide as such. Solutions of compounds of this character are unusually well adapted for the removal of hydrogen sulphide from gas in a cyclic system comprising an absorption stage and an actification stage and are so employed in the processes of my above-mentioned patents and are claimed therein.

In the operation of a cycle gas purification process, various salts, such as thiosulphates and thiocyanates, are formed as a result of side reactions. It is generally advisable to withdraw portions of the gas purification solution occasionally, both for the purpose of limiting the concentration of dissolved salts in the system and for the purpose of recovering such salts. No method has existed heretofore for the satisfactory removal of arsenic from such withdrawn portions of the gas purification solution, and, consequently, withdrawals of portions of the gas purification solution in the past have necessarily resulted in losses of essential and valuable active arsenic compound and also in contamination of the dissolved salts.

An object of my present invention is to provide a process of recovering arsenic from solutions of the character indicated.

A second object of my invention is to provide a process of recovering dissolved salts from gas purification solutions of the character indicated, in a form relatively uncontaminated with arsenic.

A further object of my invention is to provide a process of recovering arsenic from arsenical solutions of any character.

My invention has for further objects such other operative advantages or results as may hereinafter be found to obtain.

It is to be understood that the term "arsenic" in the present specification may designate an arsenic compound. For example, the term "recovery of arsenic" refers to the recovery of arsenic in the form of one of its compounds rather than to the recovery of metallic arsenic.

As recited hereinabove and in the prior patents already referred to, it is desirable for gas purification purposes to bring arsenic into the form of a thio-compound, preferably of an alkali or an alkaline earth metal. This is accomplished by sulphiding a solution containing arsenic and an alkali metal or an alkaline earth metal and subsequently aerating or otherwise oxidizing the sulphided product to convert it to the active form desired. This active thio-arsenic compound may be recirculated through an absorption stage for removal of hydrogen sulphide from gas and through an actification stage where it is aerated and thereby regenerated with liberation of free sulphur.

I have discovered that, when carbon dioxide is passed into a solution of such a thio-arsenic compound when the latter is in an active, rather than a fully sulphided condition, the bulk of the arsenic is precipitated. The composition of the precipitate has not been identified. It is yellow and is probably one of the arsenic sulphides. For purposes of identification and convenience, the term "arsenic sulphide" will be used hereinbelow to designate this precipitate.

I have also discovered that carbon dioxide does not precipitate this arsenic sulphide from a fouled solution, i. e., a solution saturated with hydrogen sulphide. Consequently, the solution is preferably brought into a well actified state by aeration prior to being subjected to carbonation.

When it is desired to withdraw portions of the gas purification solution and to recover arsenic therefrom, prior to discarding or treatment for the recovery of dissolved salts, the procedure is preferably as follows: First, the solution is brought into a well actified state by aerating it, preferably with finely comminuted air, for as long a time as may be necessary. When actification is accomplished, the solution is treated with carbon dioxide, also preferably with finely comminuted air, in any suitable apparatus. Any source of carbon dioxide such as flue gas or purified fuel gas may be utilized. Carbonation of the solution results in the precipitation of an arsenic sulphide and is continued until no more of the same precipitates. The solution may then be filtered or decanted and the clear filtrate or supernatant solution is discarded or treated for the recovery of dissolved salts, as desired.

I have also discovered that the precipitate thrown down by carbonating the solution of thio-arsenic may be redissolved by aeration and also that this precipitate is soluble in solutions of alkalies. Consequently, the precipitate from the above operation may be mixed with water and aerated or dissolved in a solution of an alkali, such as sodium carbonate, with or without aeration. The resultant solution is preferably returned to the gas purification system.

While I have described my invention hereinabove as relating to the removal of arsenic from solutions of such thio-arsenic compounds or the like as are useful for gas purification, my invention is not limited to the treatment of such solutions but may be applied to the recovery of arsenic from arsenical solutions of substantially any character. For such purpose, it is necessary to convert the arsenic in such solution to a thio-arsenic compound, preferably by sulphiding and aerating the solution in the presence of an alkali metal or alkaline earth metal. The resultant solution of thio-arsenic compound is then carbonated to precipitate the arsenic and filtered or decanted as before.

My invention presents an advantageous process of treating arsenical solutions and more particularly gas purification solutions for the recovery of arsenic therefrom.

A further advantage of my invention resides in the fact that it provides a process for treating toxic wastes containing arsenic to render them substantially inocuous.

My invention is not limited to the specific examples given hereinabove by way of illustration but may otherwise be embodied and practiced within the scope of the following claims.

I claim as my invention:

1. The process of removing arsenic from a solution thereof which comprises converting the arsenic into a thio-arsenic compound of an alkali-forming element and passing carbon dioxide therethrough to precipitate arsenic in the form of a compound thereof.

2. The process of removing arsenic from a solution containing it which comprises sulphiding and aerating the solution, passing a gas containing carbon dioxide therethrough to precipitate the arsenic in the form of a compound thereof and removing the precipitate.

3. The process of removing arsenic from a fouled arsenical gas purification solution which comprises aerating the solution, subjecting it to the action of carbon dioxide to produce a precipitate containing arsenic and separating the precipitate from the solution.

4. The process of treating an arsenical gas purification liquid which comprises withdrawing a portion thereof, aerating said portion, subsequently carbonating said portion to precipitate arsenic therefrom in the form of an arsenic compound, filtering said portion, redissolving said precipitate by aeration and returning the resultant solution to the residual gas purification solution.

5. The process of treating an arsenical gas purification liquid which comprises withdrawing a portion thereof, aerating said portion, subsequently carbonating said portion to precipitate the arsenic therefrom in the form of an arsenic compound, filtering said portion, making a suspension of said precipitate in water, aerating said suspension to redissolve the precipitate, and returning the resultant solution to the gas purification solution.

6. The process of removing arsenic from a liquid containing a thio-arsenic compound of an alkali-forming element which comprises passing carbon dioxide through the liquid to precipitate an arsenic compound, and removing the same.

7. The process of removing arsenic from a liquid containing a thio-arsenic compound of an alkali-forming element which comprises acidifying the liquid with carbon dioxide, and removing the precipitate formed thereby.

In testimony whereof, I have hereunto subscribed my name this 15th day of March, 1927.

HERBERT A. GOLLMAR.